United States Patent [19]

Schaff et al.

[11] Patent Number: 5,042,357
[45] Date of Patent: Aug. 27, 1991

[54] PYROFUZE AIRCRAFT ORDNANCE ARMING SYSTEM

[75] Inventors: James M. Schaff; Charles L. Maples; Stephen F. Lyda; David W. Brewton; Stephen R. Ritchie, all of Ridgecrest, Calif.

[73] Assignee: The United States of America as represented by the Secretary of the Navy, Washington, D.C.

[21] Appl. No.: 502,373

[22] Filed: Mar. 29, 1990

[51] Int. Cl.[5] .......................... B64D 1/04; F41F 5/00
[52] U.S. Cl. .................................. 89/1.550; 102/200; 102/293
[58] Field of Search ................. 89/1.55; 102/200, 293, 102/221

[56] References Cited
U.S. PATENT DOCUMENTS

| | | | |
|---|---|---|---|
| 3,211,057 | 10/1965 | White et al. | 89/1.55 |
| 3,228,337 | 1/1966 | Grantham et al. | 102/221 |
| 3,667,392 | 6/1972 | Grantham et al. | 102/1.55 |
| 4,204,475 | 5/1980 | Fowler | 102/221 |
| 4,936,187 | 6/1990 | Teeter | 89/1.55 |

Primary Examiner—David H. Brown
Attorney, Agent, or Firm—Harvey A. Gilbert; Melvin Sliwka; Sol Sheinbein

[57] ABSTRACT

A pyrofuze ordnance arming system, for air delivered ordnance, which provides a removable physical barrier to prevent the premature operation of ordnance device arming activation systems. An electrothermally initiated, alloyably removable pyrofuze pin extending from a pyrofuze device is employed as a physical barrier in an arming system to replace the conventional arming wires. The system increases safety and reliability for ordnance arming while decreasing the complexity and labor involved in preparing and loading ordnance on aircraft.

22 Claims, 1 Drawing Sheet

PYROFUZE AIRCRAFT ORDNANCE ARMING SYSTEM

ORIGIN OF THE INVENTION

The invention described herein was made in the performance of official duties by employees of the Department of the Navy and may be manufactured, used, licensed by or for the U.S. Government for any governmental purpose without payment of any royalties thereon.

FIELD OF THE INVENTION

The invention is related to the field of aircraft ordnance and more particularly to the arming of stores loaded on aircraft ejection racks.

BACKGROUND OF THE INVENTION

Currently, aircraft ordnance is armed by extracting arming wires from various ordnance devices as the ordnance separates from the aircraft ejection rack. Until removed, the arming wire acts as a safety pin physically preventing the arming activation mechanism from functioning. The activation devices controlled by the arming wires may be fuzes, high drag fin assemblies or any other pin restrained devices. Requiring separation ensures that the ordnance remains unarmed until it is free of the aircraft.

In a conventional ordnance ejection rack, arming wire installation and connections control how weapons are armed. The arming wires may be connected by one of two techniques, either to positive arming latches or to arming solenoids. Positive arming latches are fixed latches which extract the arming wires whenever the ordnance is released and separates from the aircraft. The arming solenoids, on the other hand, provide the pilot control over the retention or release of the respective arming wires. If the pilot selects an arming solenoid by applying power to it, the arming solenoid will retain the arming wire causing it to be extracted from the ordnance device arming activation mechanism as the ordnance separates from the aircraft. If the pilot does not select an arming solenoid, the ordnance will be released with that arming solenoid's arming wire intact; that is, the ordnance device in which the released arming wire is installed remains unarmed.

There are numerous deficiencies associated with arming wire ordnance activation which can reduce weapon effectiveness, decrease safety and damage aircraft. These deficiencies include:

1. complicated installation procedures which are labor intensive and prone to error;
2. unreliable operation of pilot selected arming solenoids;
3. improper arming caused by defective arming wires which may break before being extracted from the ordnance device;
4. damage to composite material or paint removal from the aircraft caused by the airstream whipping broken arming wires against the aircraft skin; and
5. damage to the aircraft caused by Fahnestock or safety clips which become airborne debris once the arming wire is extracted from the ordnance device activation mechanism.

SUMMARY OF THE INVENTION

The pyrofuze arming system is a new and novel electrically activated ordnance arming system for controlling ordnance on an aircraft. An object of the pyrofuze ordnance arming system is to functionally replace the arming wire connections between the aircraft ejection rack and the ordnance. Another object of the system is to increase the safety and reliability of ordnance arming while decreasing the handling involved in preparing and loading ordnance. Yet another object of the pyrofuze ordnance arming system is to provide a retrofittable system for existing ejection racks designed to carry current inventory series ordnance. Still another object of the invention is to provide an electrically controllable device which functions as a safety pin for physically restraining various ordnance device arming activation mechanisms.

The invention comprises a separation-detection subsystem, a detection-initiation subsystem, an interconnect subsystem, and pyrofuze devices. The pyrofuze pin which is the essential element of the pyrofuze devices is disclosed in detail in a copending application entitled Pyrofuze Pin For Ordnance Activation, Ser. No. 07/470,190, filed Mar. 9, 1990, which is hereby incorporated by reference herein. In the normal sequence of operation of the system the separation-detection subsystem senses that ordnance has irrevocably separated from the ejection rack. Mechanical, electrical, magnetic and optical separation sensors may be employed. The detection-initiation subsystem then, through the interconnect subsystem, activates the pyrofuze devices and energizes the ordnance electrical fuze in response to data received from the separation-detection subsystem. The interconnect subsystem contains the umbilical cable which conducts power from the aircraft to the pyrofuze devices during the initial phase of the ordnance separating from the aircraft.

BRIEF DESCRIPTION OF THE DRAWINGS

The above and numerous other advantages of the present invention will be readily understood from the following detailed description when read in view of the appended drawings wherein.

DETAILED DESCRIPTION OF THE INVENTION

Figure 1:
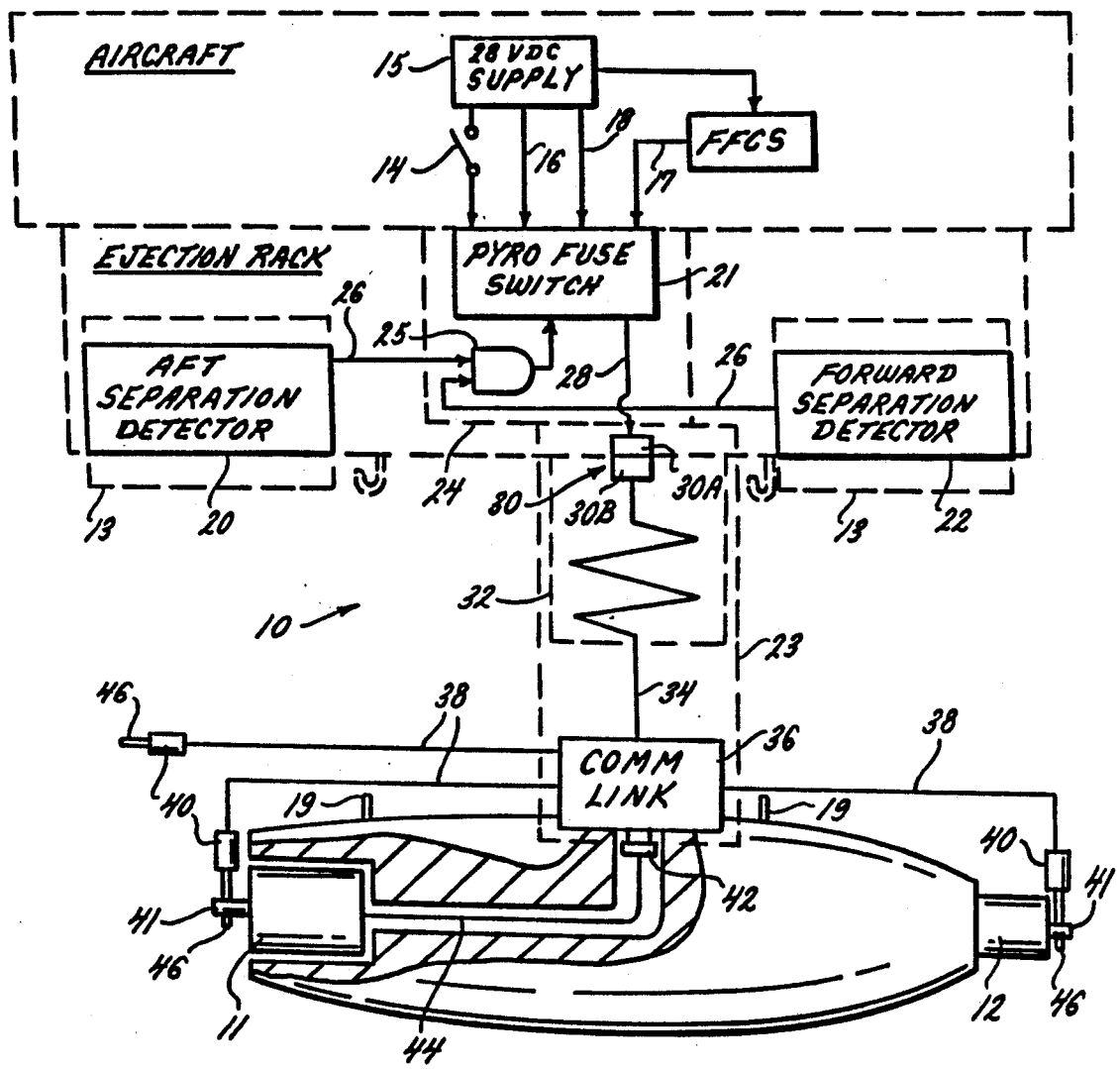
FIG. 1 is a block diagram of the pyrofuze ordnance arming system as applied to a gravity bomb outfitted with a nose fuze and a tail fuze.
Figure 2:
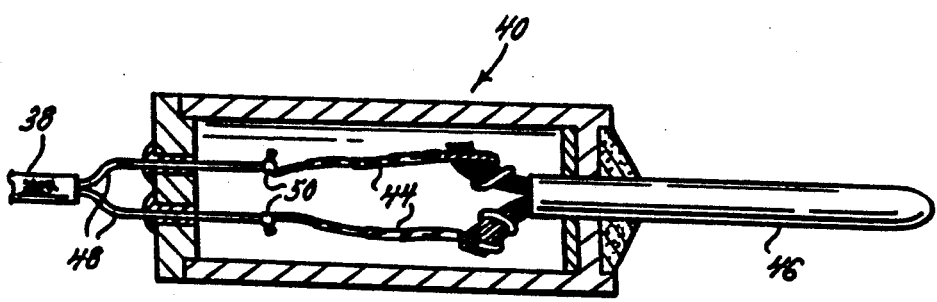
FIG. 2 is a cross section of a side view of the pyrofuze device.

FIG. 1 is a block diagram of the pyrofuze ordnance arming system, depicted generally by the numeral 10, illustrating a typical application of the system applied to a gravity type bomb fitted with a nose fuze 12 and a tail fuze 11. Power for the system is supplied from three sources: a constant 28 VDC supply 15 provided by the ordnance release switch 14, the aft arming solenoid power 16, and the forward arming solenoid power 18. The separation-detection subsystem 13 comprises the aft separation-detector 20 and the forward separation-detector 22 located on the ordnance ejection rack in juxtaposition with the forward and aft lugs 19 on the ordnance and which sense the release of the ordnance. The separation-detectors 20 and 22 are connected to detection-initiation circuitry by shielded cables 26. The detection-initiation subsystem 24 comprises the detection-initiation circuitry which processes the separation-detector data. Based on the detection results, the detection-initiation circuitry 24 switches initiation power through the interconnect subsystem 23 to pyrofuze devices 40 and switches the fuze function control set (FFCS) 17 to the electric fuze by means of an electrical switching device 21. The interconnect subsystem 23 is comprised of the shielded cable 28, the payout assembly 32, the umbilical cable 34, the Communication Link Replacement (COMM Link) 36, and the single conductor shielded cables 38. The multiple conductor shielded cable 28 conducts detection-initiation circuitry 24 output to payout assembly 32. One half of umbilical connector 30a is mounted on the end of the multiple conductor shielded cable 28 and is secured to a fixed point either on the aircraft or on the ordnance ejection rack. The mating half of the umbilical connector 30b is mounted to umbilical cable 34 which comprises a multiple conductor shielded cable. The umbilical cable 34 is stored in payout assembly 32 except for that portion which extends from the payout assembly 32 to Communication Link replacement (COMM LINK) 36 disposed on the ordnance. The shielding of the cable 34 is firmly attached to the mating half of umbilical connector 30b and to the COMM Link 36. The multiple conductors of umbilical cable 34 are separated in COMM Link 36 and routed to the appropriate terminals. Data from the aircraft fuze function control set (FFCS) 17 is connected to the ordnance internal wiring 44 through existing terminal 42 within the ordnance to the electrically operated tail fuze 11, in the fuzing configuration shown in FIG. 1. The other conductors of the umbilical cable 34 are connected to single conductor shielded cables 38 and routed externally around the ordnance to the pyrofuze devices 40. The pins 46 of the pyrofuze devices 40 are installed in an ordnance arming activation system 41 such as that on the tail fuze 11. Electrical power supplied by way of the umbilical cable 34 to the pyrofuze devices 40 is applied at the electrical leads 48 which connect internally to pyrofuze connections 50, as depicted in FIG. 2.

The mode of operation of the pyrofuze ordnance arming system 10 is based on the arming configuration selected by the pilot. The pyrofuze ordnance arming system is wired in parallel with the conventional arming wire system. The arrangement allows the option of arming the ordnance with the pyrofuze ordnance arming system or conventional arming wire system without any additional pilot input. However, only one system can be in use at one time.

The pyrofuze ordnance arming sequence begins by sensing the release of the ordnance with the separation-detection subsystem 13. The separation-detectors, aft 20 and forward 22, one each for the aft and forward lugs 19, respectively, on the ordnance, are mounted on the ejection rack and sense the presence of the weapon surface near each lug 19. If the weapon surface is present, the ordnance has not released.

The detection-initiation circuitry 24 has two functions. The first function uses a logic circuit 25 to process the data from each separation-detector 20 and 22. When each detector senses lug 19 separation from the ejection rack, the logic circuit will generate an enable signal. If one or both of the detectors sense a lug 9 present, the logic circuit 25 will not generate an enable signal. The enable signal controls the second function of the detection-initiation circuitry 24, namely, the power switching device 21 for the pyrofuze initiation channels. Therefore, ordnance can only be armed when a positive separation has occurred and an enable signal exists. An AND or similar type of logic circuit known to those skilled in the art may be used for processing the separation signals.

The enable signal activates all the pyrofuze initiation channels in the detection-initiation circuitry 24. The role of each channel, "positive arm" or "pilot selectable", is determined by the source of its power. The 28 VDC supply 15, activated by the ordnance release switch 14, powers the positive arming channels. The positive arming channels function whenever the ordnance is released and the enable signal is present.

Referring now to FIG. 1, the positive arming channels perform two functions. One function is the initiation of pyrofuze devices connected to the positive arming channel whenever the ordnance completely separates from the aircraft. The other function is to operate an electrical switching device 21 that passes the fuze function control set (FFCS) 17 signal to the electric fuze 11. Because the 28 VDC supply 15 is always present during weapons release, it is also used to power the separation-detectors 20 and 22 and the logic circuit 25 in the detection-initiation circuitry 24.

The selectable pyrofuze initiation channels derive their power from the arming solenoids at 16 and 18. In this way when an arming solenoid is selected, the corresponding initiation channel also has power. If an arming solenoid is not selected then its corresponding initiation channel will remain inactive after the enable signal is present.

The payout assembly 32 contains a multiple conductor shielded umbilical cable 34 that connects the detection-initiation circuitry 24 to the ordnance. When released, the ordnance pulls umbilical cable 34 from payout assembly 32. The umbilical connector 30 is pulled apart at connectors 30a and 30b when the umbilical cable 34 has traveled its length. Therefore, the length of the umbilical cable 34 governs the duration of the application of electrical power to the pyrofuze devices 40. Since the alloying reaction of the pyrofuze pin 46 results in the disintegration and elimination of the pin allowing the arming sequence to begin, the umbilical cable 34 must be of sufficient length to allow electrothermal initiation of the alloying reaction in the pyrofuze devices 40 before connector 30 separates. Umbilical cable 34 is attached to the COMM Link 36 and remains with the ordnance.

The pyrofuze arming system 10 provides several novel features not available in current arming systems. The pyrofuze pins 46 allow the release and operation of the arming activation systems for the various ordnance devices used to arm the weapon. The electric current from the initiation circuitry initiates the pyrofuze alloying reaction. The alloying reaction reduces the pyrofuze pins 46 to small molten globules of material which are not capable of physically preventing the activation mechanism from functioning. The ordnance device arming activation system is thus released. By eliminating the arming wires and the arming solenoids from the arming sequence, deficiencies of the prior art are avoided.

The pyrofuze ordnance arming concept of the present invention prevents the inadvertent arming of partially released ordnance. The use of individual separation-detectors 20 and 22 for each weapon surface near each lug 19 prevents the generation of an enable signal until all lugs are free. Hence, the arming of a hung or partially released ordnance is precluded.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. An ordnance arming system for pre-launch control of an arming activation system connected to a fuze in an aircraft borne ordnance mounted to an ejection rack affixed to an aircraft, said aircraft providing power and a fuze function control signal for said ordnance arming system, comprising:
   means affixed to said ejection rack in juxtaposition with said ordnance for detecting separation of said ordnance from said ejection rack and producing a separation indicating signal as a result thereof;
   an alloyably removable means disposed in obstructive association with said arming activation system for making said system inoperative until said alloyably removable means is removed;
   a means for receiving said separation indicating signal, said power, and said fuze function control signal and producing a removal activation signal; and
   a quick disconnect means for connecting said means for receiving said separation indicating signal, said power, and said fuze function control signal and producing a removal activation signal, to said alloyably removable means.

2. The ordnance arming system of claim 1 wherein said means affixed to said ejection rack for detecting ordnance separation comprises a separation-detector.

3. The ordnance arming system of claim 2 wherein said ordnance has at least one mounting means for removable attachment to said ejection rack and said separation-detector is mounted on said rack in juxtaposition with said mounting means.

4. The ordnance arming system of claim 2 wherein said separation-detector is magnetically coupled with said ordnance.

5. The ordnance arming system of claim 2 wherein said separation-detector is optically coupled with said ordnance.

6. The ordnance arming system of claim 2 wherein said separation-detector is mechanically coupled with said ordnance.

7. The ordnance arming system of claim 2 wherein said means for receiving said separation-indication signal, said power, and said fuze function control signal and producing a removal activation signal comprises a detection-initiation subsystem.

8. The ordnance arming system of claim 1 wherein said detection-initiation subsystem comprises:
   a logic circuit for producing an output only if said separation detector provides a signal indicating positive separation of said ordnance from said aircraft; and
   a switching circuit which provides an initiation signal output upon receiving said logic signal output corresponding to said positive ordnance separation.

9. The ordnance arming system of claim 1 wherein said alloyably removable means comprises a pyrofuze device disposed in obstructive association with said arming activation system.

10. The ordnance arming system of claim 9 wherein said pyrofuze device has a pyrofuze pin extending therefrom into obstructive association with said arming activation system.

11. The ordnance arming system of claim 10 wherein said pyrofuze pin is rigid.

12. The ordnance arming system of claim 9 wherein said pyrofuze device is electrothermally initiated.

13. The ordnance arming system of claim 12 wherein said pyrofuze device comprises:
   a housing;
   electrical leads entering one end of said housing;
   a rigid pyrofuze pin exiting the opposite end of said housing: and
   pyrofuze connections within said housing affixed in contact with and extending between said leads and said pin.

14. The ordnance arming system of claim 1 wherein said quick-disconnect means comprises an interconnect subsystem.

15. The ordnance arming system of claim 14 wherein said interconnect subsystem comprises:
   a payout assembly;
   a multiple conductor shielded cable extending between and connecting said detection-initiation subsystem and said payout assembly;
   a communication link;
   an umbilical cable extending between and connecting said communication link with said payout assembly; and
   a single conductor shielded cable extending between and connecting said communication link with said pyrofuze device.

16. The ordnance arming system of claim 15 wherein said payout assembly comprises:
   a quick-disconnect connector having two mating halves, one half of which is connected to said multiple conductor shielded cable from a detection-initiation subsystem; and
   a quantity of unpaid-out umbilical cable, one end of which is connected to the other half of said quick-disconnect connector and the other end of which extends out of said payout assembly integrally as said umbilical cable in connection with said communication link.

17. The ordnance arming system of claim 16 wherein the length of said unpaid-out umbilical cable in said payout assembly is determined to correspond with the time of application of said initiation signal prior to disconnect of said quick-disconnect connector as said ordinances moves away from said aircraft.

18. An ordnance arming system for controlling an arming activation system operatively associated with a fuze in an aircraft-borne ordnance having means for mounting said ordnance to an ordnance ejection rack affixed to the aircraft, said ordnance arming system comprising:
   a source of electrical power extending from said aircraft to said ordnance arming system;
   a means for selecting fuzes to be used extending from said aircraft to said ordnance arming system;
   a separation-detection subsystem disposed on said ejection rack in juxtaposition with said ordnance for detecting separation of said ordnance from said ejection rack and generating an electrical signal in response thereto;
   a pyrofuze device affixed to said ordnance in juxtaposition with said arming activation system and having a pyrofuze pin removably extending into said arming activation system to make said system inoperable unit pin removal; and a detection-initiation subsystem electrically connected to said separation-detection subsystem for receiving and processing said electrical signal therefrom and producing a pyrofuze device initiation signal;

an interconnect subsystem operatively connected between said detection-initiation subsystem and said pyrofuze devices.

19. The ordnance arming system of claim 18 wherein said detection-initiation subsystem comprises:

a means for determining positive separation of said ordnance from said aircraft and providing an output indicative thereof; and a means for reacting to said output indicative of positive separation and providing an initiation signal output in response thereto.

20. The ordnance arming system of claim 19 wherein said means for determining positive separation and providing an output indicative thereof comprises an AND circuit.

21. The ordnance arming system of claim 20 wherein said means for reacting to said output indicative of positive separation and providing an initiation signal input in response thereto comprises a switching means connected to receive the output of said AND circuit and a source of initiation signal and to output said initiation signal to said interconnect subsystem.

22. The ordnance arming system of claim 21 wherein said source of initiation signal is a DC supply.

* * * * *